W. R. BUTNER.
RATCHET CHAIN BLOCK.
APPLICATION FILED SEPT. 3, 1920.
1,375,558.
Patented Apr. 19, 1921.
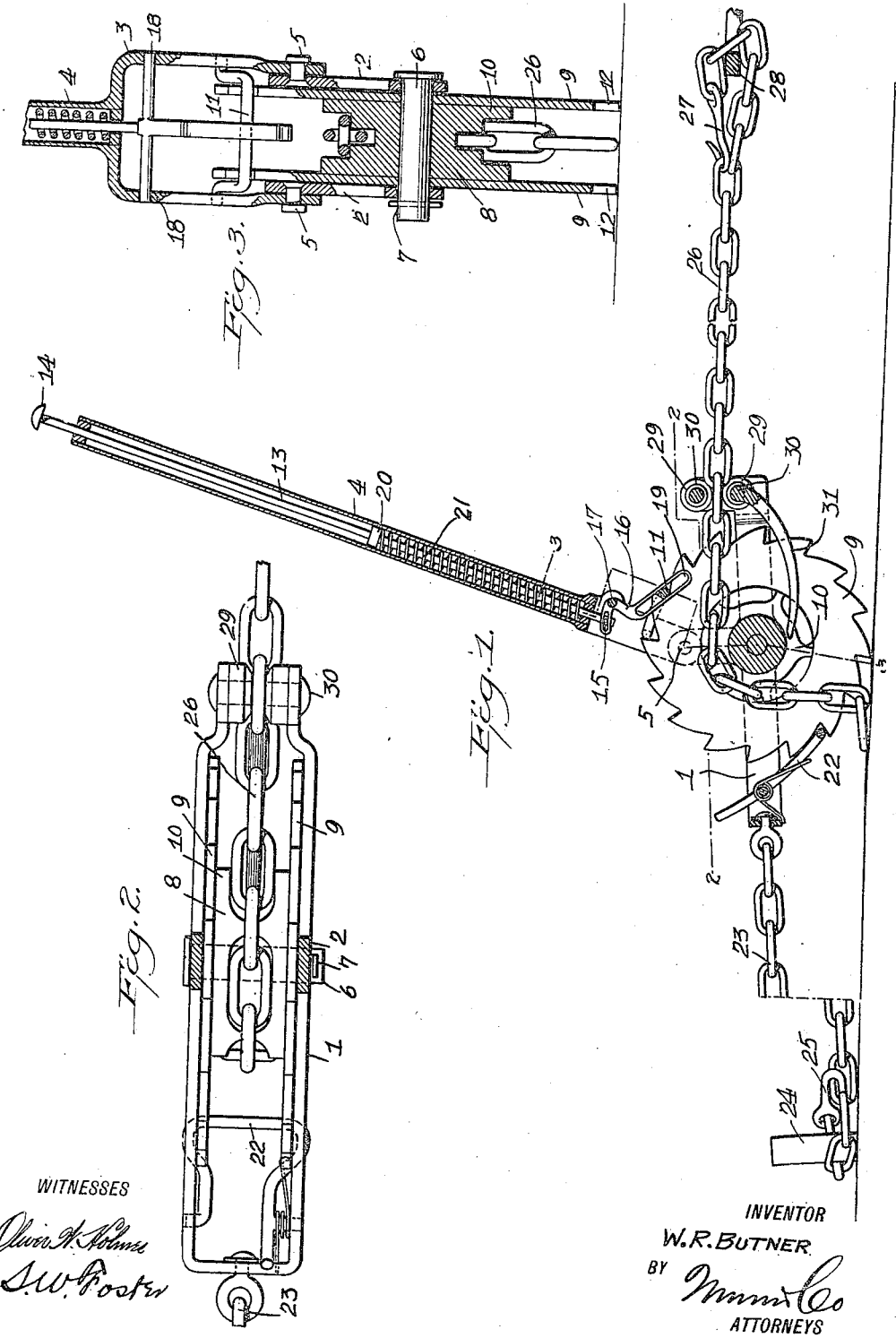
WITNESSES
INVENTOR
W. R. BUTNER
BY
ATTORNEYS

UNITED STATES PATENT OFFICE.

WILLIAM RICHARDSON BUTNER, OF YERINGTON, NEVADA.

RATCHET-CHAIN BLOCK.

1,375,558.  Specification of Letters Patent.  Patented Apr. 19, 1921.

Application filed September 3, 1920. Serial No. 408,107.

*To all whom it may concern:*

Be it known that I, WILLIAM R. BUTNER, a citizen of the United States, and a resident of Yerington, in the county of Lyon and State of Nevada, have invented a new and Improved Ratchet-Chain Block, of which the following is a full, clear, and exact description.

This invention relates to improvements in ratchet chain blocks, an object of the invention being to provide a device of the character stated, which can be easily and conveniently operated and which can be folded into relatively small space when not desired for use.

A further object is to provide a ratchet chain block having one side thereof anchored and the movable chain operatively connected to the other side of the block and caused to move by the oscillation of the lever imparting rotary movement to a chain sprocket wheel and provide improved means for controlling the ratchet engagement of the lever with the ratchet wheels and improved means for preventing the chain from entangling in the sprocket wheel.

With these and other objects in view the invention consists in certain novel features of construction, and combinations and arrangements of parts as will be more fully hereinafter described and pointed out in the claims.

In the accompanying drawings—

Figure 1 is a view in vertical longitudinal section illustrating my improved ratchet chain block.

Fig. 2 is an enlarged sectional plan view on the line 2—2 of Fig. 1.

Fig. 3 is an enlarged view in longitudinal section on the line 3—3 of Fig. 1.

1 represents an oblong-shaped open frame which may consist of a single integral member bent into the shape shown and having uprights 2, 2, thereon to which the bifurcated lower end 3 of the lever 4 is pivotally connected as shown at 5. This pivotal connection 5 serves as a hinge so that the lever can be swung down beside the frame and occupy but little space when not in use.

An axle 6 is mounted in the intermediate portion of the frame and is removably secured in place by means of a cotter pin or other removable securing device 7. A chain operating wheel 8 has rotary mounting on the axle 6 and comprises a pair of ratchet wheels 9, 9, with a chain sprocket wheel 10 between them. These ratchet wheels and sprocket wheel can be separate parts rigidly secured together or they may constitute a single member as may be desired.

A pawl 11 is pivotally supported at its ends in the members of the bifurcated end 3 of lever 4 and is in the form of a relatively wide crank arm which engages the ratchet teeth 12 of both ratchet wheels 9, so that when the lever is oscillated on its pivots 5, it will impart a step-by-step rotary movement to the wheel 8.

The lever 4 is of tubular form and provides mounting in the interior thereof for a a push rod 13, the latter extending beyond the outer end of the lever having a push button 14 thereon, and also extending beyond the lower end of the lever and having slot and pin connection 15 with a pawl operating crank lever 16. This lever 16 is fixed to a cross pin 17 having pivotal mounting in the bifurcated lower end 3 of lever 4, as shown at 18, and the free end of this lever 16 is relatively long and provided with a slot 19 through which the intermediate portion of the pawl 11 projects, so that the pivotal movement of the lever 16 will operate to lift the pawl 11 out of operative engagement with the ratchet wheels 9.

A shoulder 20 is provided on the push rod 13 within the lever 4 and a coiled spring 21 is located in the lower portion of the lever and exerts pressure against the shoulder 20, so that the rod 13 operates normally to press the pawl 11 into operative engagement with the ratchet wheels 9, but when a downward longitudinal movement is had upon the rod 13, the pawl will be lifted out of engagement with the ratchet wheels.

A spring pressed pawl 22 is pivotally connected to the frame 1 and engages the ratchet wheels 9 to prevent retrograde movement of the wheels. 23 represents an anchored chain which is known in the art as a "pull chain," which is secured at one end to one end of the frame and at its other end is adapted to be anchored around any fixed part, as for example, a stake 24, and is provided with the ordinary hook 25 to secure the end of the chain.

26 represents a movable chain which is known in the art as a "feed chain," which is provided at one end with a hook 27 so that it may be readily coupled around a device as indicated at 28, for imparting longitudinal movement to the lever. This chain 27 is passed between a pair of grooved guide rollers 29 supported on rivets or other journals 30 fixed in the frame 1 and a stripper arm 31 is made integral with one of these rivets or journals 30 and has its free end located in proximity to the sprocket wheel 10, so as to strip the chain 26 from the sprocket wheel and prevent any of the links from falling around the sprocket wheel beyond the predetermined point which would entangle or interfere with the operation of the device.

The operation is as follows: With the parts as shown in Fig. 1, an oscillating motion imparted to the lever 4 will, through the medium of the pawl 11, impart a step-by-step movement to the ratchet wheels 9 and sprocket wheel 10 constituting my improved adjusting wheel 8. This movement of the wheel 8 will exert a pull on the chain 26 and the pawl 22 will prevent the retrograde movement of the wheel.

It will be noted that the pawl 22 is pivotally supported between its ends so that the upper end of said pawl constitutes a handhold so that the pawl can be operated as a lever to manually release the same from the ratchet wheels tooth-by-tooth.

The operation of rod 13 by the push button 14 permits the pawl 11 to be forced out of engagement with the ratchet wheels, and by manipulating the pawls manually, first one and then the other, the load can be released or lowered step-by-step as well as positively moved in the opposite direction.

During both operations the lever 4 is oscillated, and during the raising or turning of the load, the pawl 22 is held in engagement by its spring and is positively released from engagement with the pawl to allow the wheel to turn a distance of one tooth, the movement being controlled by the lever 4 as the pawl 11 will be in engagement with the ratchet teeth. In other words, the lever 4 can be manually moved a distance of one tooth or permitted to move a distance of one tooth while the pawl 22 is out of engagement with the ratchet teeth. The lever and pawl 11 can then be manipulated to take a new hold on an advanced tooth and the operation again repeated so that the load can be released or lowered gradually step-by-step.

I have not attempted to point out the many uses of my improved ratchet chain block as it is obvious that its use is unlimited wherever it is desired to cause a pull upon the chain to move an obstinate device; as for example, the device may be used for pulling cars out of ditches, pulling them to upright position after they turn over, pulling them out of mud holes when they are stuck, pulling up fences, posts, stretching barbed wire, poultry netting and fence netting of any sort, for removing stumps, and for a great number of other uses, and hence, I do not limit myself to any particular use of the device but desire to cover broadly any use to which it can be put.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A ratchet chain block, comprising a frame, a lever pivotally connected to the frame, a wheel having rotary mounting in the frame and comprising a central sprocket wheel and ratchet wheels at opposite sides thereof, a pawl pivotally connected to the lever and engaging both ratchet wheels, a member pivotally connected to the lever engaging the intermediate portion of the pawl, and a spring pressed rod carried by the lever and controlling the operation of said member.

2. A ratchet chain block, comprising a frame, a lever pivotally connected to the frame, a wheel having rotary mounting in the frame and comprising a sprocket wheel and a ratchet wheel, a pawl carried by the lever and engaging the ratchet wheel, a slotted pawl operating lever receiving the pawl and pivotally connected to the first-mentioned lever, and means on the first-mentioned lever for operating the pawl controlling lever.

3. A ratchet chain block, comprising a frame, a wheel having rotary mounting in the frame and consisting of a pair of ratchet wheels and a sprocket wheel between them, a lever pivotally connected to the frame, a pawl pivotally connected to the lever and engaging both ratchet wheels, a pawl operating crank arm having a slot therein receiving the pawl, a push rod in the first-mentioned lever operatively engaging the pawl controlling lever, and a spring exerting pressure on the push rod normally holding the pawl in engagement with the ratchet wheel.

4. A ratchet chain block, comprising a frame, a wheel having rotary mounting in the frame and comprising a pair of ratchet wheels and a sprocket wheel between them, a spring pressed pawl on the frame engaging the ratchet wheels and holding them against retrograde movement, a pull chain connected to one end of the frame, a feed chain engaging the ratchet wheels, a pair of guide rollers through which the feed chain passes in its passage to the sprocket wheel, and a stripper arm supported by the frame and having its free end adjacent the sprocket wheel, whereby the links of the chain are prevented from moving a too great distance around the sprocket wheel.

WILLIAM RICHARDSON BUTNER.